United States Patent
Pierce et al.

(10) Patent No.: US 8,055,948 B2
(45) Date of Patent: Nov. 8, 2011

(54) RESILIENT SOFTWARE-CONTROLLED REDUNDANT ARRAY OF INDEPENDENT DISKS (RAID)

(75) Inventors: Justin Pierce, Cary, NC (US); David Steiner, Raleigh, NC (US); Richard W. Vanderpool, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 12/558,952

(22) Filed: Sep. 14, 2009

(65) Prior Publication Data

US 2011/0066881 A1    Mar. 17, 2011

(51) Int. Cl.
    G06F 11/00    (2006.01)
(52) U.S. Cl. ............................................. 714/36; 713/2
(58) Field of Classification Search ...................... 714/36
    See application file for complete search history.

(56) References Cited

U.S. PATENT DOCUMENTS

| | | | | |
|---|---|---|---|---|
| 5,950,230 | A * | 9/1999 | Islam et al. | 711/156 |
| 6,035,395 | A * | 3/2000 | Saito | 713/1 |
| 6,098,119 | A | 8/2000 | Surugucchi et al. | |
| 6,282,641 | B1 | 8/2001 | Christensen | |
| 6,292,890 | B1 | 9/2001 | Crisan | |
| 6,643,735 | B2 * | 11/2003 | Rodriguez et al. | 711/114 |
| 6,823,450 | B2 * | 11/2004 | Ott | 713/1 |
| 6,931,519 | B1 * | 8/2005 | Keller | 713/1 |
| 6,952,794 | B2 | 10/2005 | Lu | |
| 7,281,159 | B2 * | 10/2007 | Gold | 714/5.1 |
| 7,430,592 | B2 | 9/2008 | Schmidt et al. | |
| 7,584,347 | B2 * | 9/2009 | El-Haj-mahmoud et al. | 713/1 |
| 7,861,117 | B2 * | 12/2010 | Coronado et al. | 714/36 |
| 2002/0178351 | A1 * | 11/2002 | Ott | 713/2 |
| 2003/0005277 | A1 * | 1/2003 | Harding et al. | 713/2 |
| 2007/0128899 | A1 * | 6/2007 | Mayer | 439/152 |
| 2007/0168701 | A1 | 7/2007 | Prabhakaran | |
| 2007/0294582 | A1 * | 12/2007 | Rangarajan et al. | 714/36 |
| 2008/0177994 | A1 * | 7/2008 | Mayer | 713/2 |
| 2008/0244585 | A1 | 10/2008 | Candea et al. | |
| 2009/0113195 | A1 * | 4/2009 | Mohrmann et al. | 713/2 |

* cited by examiner

*Primary Examiner* — Scott Baderman
*Assistant Examiner* — Kamini Patel
(74) *Attorney, Agent, or Firm* — Thomas Tyson; Jeffrey L. Streets

(57) ABSTRACT

Method and computer program product for identifying a primary disk storage medium that is higher in a boot order than a secondary disk storage medium in a software RAID, and testing for a hardware failure of the primary disk storage medium during the BIOS power-on self test. The boot order of the disk storage mediums in the software RAID is automatically changed to position the secondary disk storage medium in the RAID higher in the boot order than the primary disk storage medium in response to detecting a hardware failure in the primary disk storage medium. The operating system is then booted from the disk storage medium that is highest in the boot order. A hardware failure may be detected by reading and verifying a predetermined portion of the boot partition of the disk storage medium. Optionally, the predetermined portion of the boot partition may be less than the entire primary disk storage medium, but is preferably sufficient to allow loading of software RAID drivers for the primary and secondary disk storage mediums.

14 Claims, 1 Drawing Sheet

RESILIENT SOFTWARE-CONTROLLED REDUNDANT ARRAY OF INDEPENDENT DISKS (RAID)

BACKGROUND

1. Field of the Invention

The present invention relates to the use of a software-controlled redundant array of independent disks (software RAID), and more specifically relates to dealing with a disk failure in a software RAID system.

2. Background of the Related Art

A redundant array of independent disks (typically referred to by the acronym RAID) refers generally to a group of computer data storage schemes that can divide and replicate data among multiple data storage devices, such as hard disk drives. An implementation of RAID may take the form of hardware RAID or software RAID. Hardware RAID uses dedicated hardware to control the array of disks. This hardware component may be referred to as a dedicated RAID controller. In software RAID, by contrast, the functions required to implement the RAID array are preformed by the system processor using special software routines. Since management of the array is a low-level activity that must be performed in support of other software that runs on processor, software RAID is usually implemented by the installed operating system and drivers which emulate a dedicated hardware RAID controller.

One disadvantage of a software RAID implementation is that a hardware failure occurring in the boot portion of the source disk will prevent the operating system from even loading. Accordingly, the system will become unusable until a system administrator manually restores the system by either replacing the damaged disk or revising the code in the Basic Input/Output System (BIOS). Either approach to restoring the system results in significant downtime and expense.

BRIEF SUMMARY

One embodiment of the present invention provides a computer program product including computer usable program code embodied on a computer usable storage medium for handling hardware failures in a software RAID. The computer program product comprises computer usable program code for detecting hardware failure of a primary disk storage medium in a software RAID during the BIOS power-on self test (POST), and automatically changing the boot order of the disk storage mediums in the RAID to position a secondary disk storage medium in the RAID higher in the boot order ahead of the primary disk storage medium in response to detecting hardware failure of the primary disk storage medium.

Another embodiment of the invention provides a method comprising identifying a primary disk storage medium that is higher in a boot order than a secondary disk storage medium in a software RAID, and testing for a hardware failure of the primary disk storage medium during the BIOS power-on self test. The boot order of the disk storage mediums in the software RAID is automatically changed to position the secondary disk storage medium in the RAID higher in the boot order than the primary disk storage medium in response to detecting a hardware failure in the primary disk storage medium; and then an operating system is booted from the disk storage medium that is highest in the boot order.

DETAILED DESCRIPTION

Figure 1:
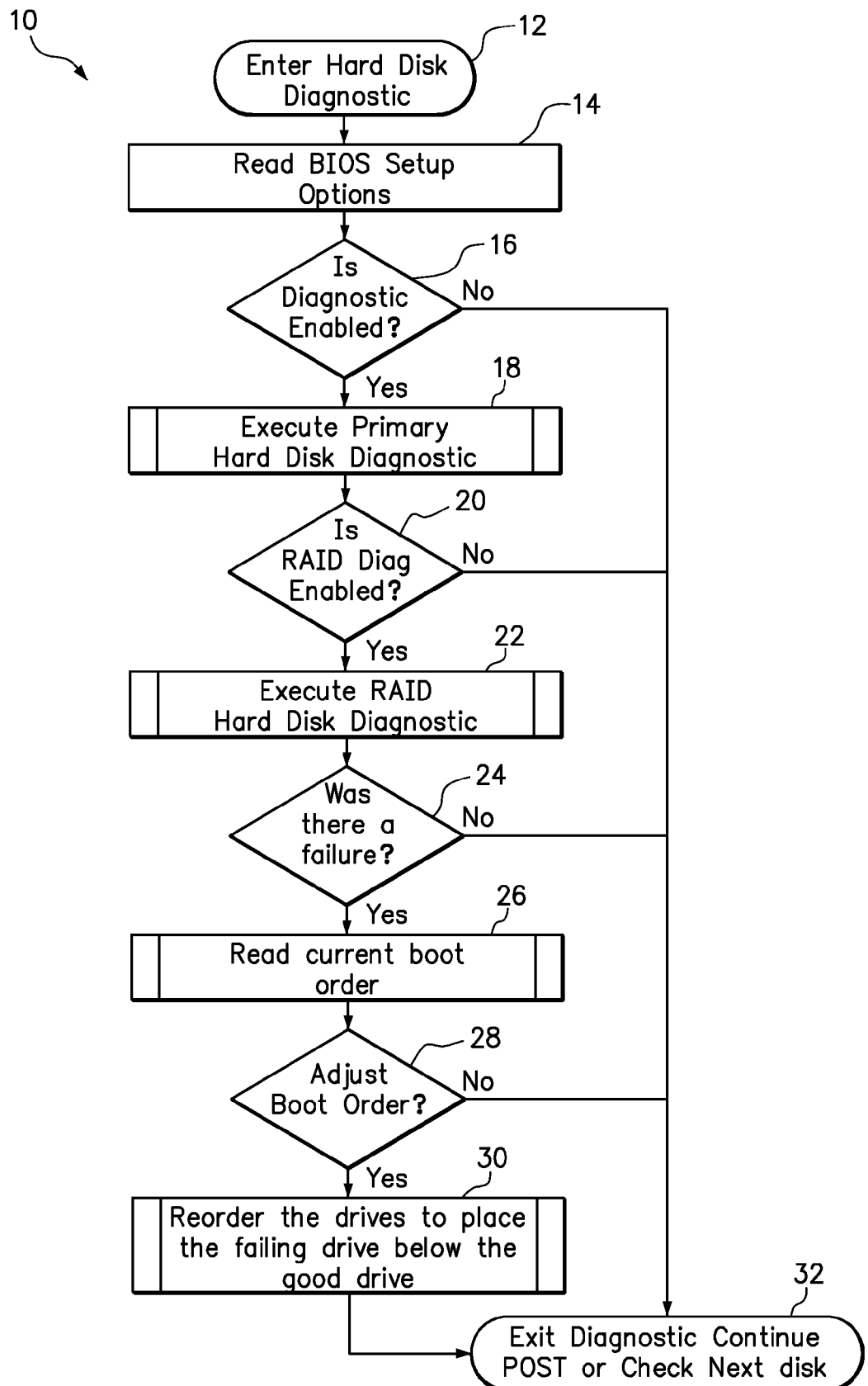
FIG. 1 is a flowchart of a method performed during BIOS POST in order to detect and address hardware failures in a disk storage medium prior to booting the operating system.

One embodiment of the present invention provides a computer program product including computer usable program code embodied on a computer usable storage medium for handling hardware failures in a software RAID. The computer program product comprises computer usable program code for detecting hardware failure of a primary disk in a software RAID during the BIOS power-on self test, and automatically changing the boot order of the disk storage mediums in the RAID to position a secondary disk storage medium in the RAID higher in the boot order ahead of the primary disk storage medium in response to detecting hardware failure of the primary disk storage medium. Optionally, the boot order may be changed so that the primary disk storage medium is positioned at the bottom of the boot order below all other disk storage mediums in the RAID. The BIOS POST may change the boot order by writing into a boot table that is typically stored in the system CMOS.

Detecting a hardware failure in a disk storage medium may be performed in various ways that may be specific to the computer system being used and the types of components installed. For example, wherein the disk storage mediums utilize the ATA interface standard for the connection of storage devices, a disk storage medium may be tested by reading and verifying the presence of physically bad sectors on an individual disk storage medium utilizing commands which are a part of the ATA standard. Specifically, the ATA commands according to the ATAPI-7 specification—0xEC(Identify) and 0x42(read/verify sectors ext)—may be used to determine the presence of a bad sector. Similarly, the disk storage medium may be tested by running a cyclic redundancy check of at least a portion of the primary disk storage medium.

Optionally, a hardware failure of a primary disk storage medium may be detected by testing a predetermined portion of the boot partition of the primary disk storage medium. For example, predetermined portion of the boot partition may be less than the entire primary disk storage medium, since the operating system does not reside over the entire disk storage medium. Specifically, the predetermined portion of the boot partition may be less than about 100 megabytes.

In accordance with the invention, the system BIOS causes the performance of boot time diagnostics of the disk storage mediums to proactively check the disk storage mediums to determine whether the medium, such as a hard disk drive, is bad. The boot time diagnostics is performed during BIOS POST, so that the boot order of the disk storage mediums can be dynamically modified, if necessary, to place the bad disk storage medium at a position below one or more good disk storage medium. Therefore, the operating system will boot from a disk storage medium that is known to be in good condition.

Regardless of the exact amount of disk storage space tested, the predetermined portion of the boot partition that is tested should be sufficient to ensure that the software RAID drivers for the primary and secondary disk storage mediums can be loaded. Once the RAID drivers are loaded by the operating system during boot, the drivers are capable of detecting problems with a disk storage medium and taking corrective action according to the exact RAID implementation. The software RAID preferably implements a RAID 1 configuration with two mirrored disk storage mediums.

Another embodiment of the invention provides a method comprising identifying a primary disk storage medium that is higher in a boot order than a secondary disk storage medium in a software RAID, and testing for a hardware failure of the primary disk storage medium during the BIOS power-on self test. The boot order of the disk storage mediums in the software RAID is automatically changed to position the secondary disk storage medium in the RAID higher in the boot order than the primary disk storage medium in response to detecting a hardware failure in the primary disk storage medium, and then an operating system is booted from the disk storage medium that is highest in the boot order. In a RAID having more than two disk storage mediums, the step of automatically changing the boot order may include positioning the primary disk storage medium lower in the boot order than all other disk storage mediums in the software RAID.

In yet another embodiment of the invention, the step of detecting hardware failure of a primary disk storage medium may include reading and verifying a predetermined portion of the boot partition of the primary disk storage medium. Optionally, the predetermined portion of the boot partition may be less than the entire primary disk storage medium, or less than about 100 megabytes. Preferably, the predetermined portion of the boot partition is sufficient to allow loading of software RAID drivers for the primary and secondary disk storage mediums. Specifically, the ATA commands—0xEC (Identify) and 0x42(read/verify sectors ext)—may be used to determine the presence of a bad sector. Similarly, the disk storage medium may be tested by running a cyclic redundancy check of at least a portion of the primary disk storage medium.

FIG. 1 is a flowchart of a method 10, which is preferably performed during BIOS POST, in order to detect and address hardware failures in a disk storage medium prior to booting the operating system. In step 12, the BIOS enters or begins diagnostics of the disk storage medium, such as a hard disk drive. The BIOS setup options are then read in step 14. If step 16 determines that disk storage medium diagnostics have been enabled, then diagnostics are executed on the primary disk storage medium in step 18. Next, if step 20 determines that RAID diagnostics are enabled, then RAID disk storage medium diagnostics are executed in step 22. If step 24 determines that the diagnostics indicated a disk storage medium failure, then step 26 reads the current boot order. If step 28 then determines that there is a need to adjust or change the boot order, the drives are reordered or repositioned in the boot order to place the failing drive below the good drive in step 30. Following step 30, or if the determinations in any of preceding decision steps 16, 20, 24, 28 are negative, then the method continues to step 32 to exit the disk storage medium diagnostics, continue the BIOS POST or check the next disk storage medium in the software RAID.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a computer usable storage medium for handling hardware failures in a software RAID, the computer program product comprising:

computer usable program code for detecting hardware failure of a primary disk in a software RAID during the BIOS power-on self test; and computer usable program code for automatically changing the boot order of the disks in the RAID to position a secondary disk in the RAID higher in the boot order ahead of the primary disk in response to detecting hardware failure of the primary disk.

2. The computer program product of claim 1, wherein the computer usable program code for changing the boot order of the disks in the RAID includes computer usable program code to position the primary disk at the bottom of the boot order below all other disks in the RAID.

3. The computer program product of claim 1, wherein the computer usable program code for detecting hardware failure of a primary disk storage medium includes computer usable program code for reading and verifying a predetermined portion of the boot partition of the primary disk storage medium.

4. The computer program product of claim 3, wherein the predetermined portion of the boot partition is less than 100 megabytes.

5. The computer program product of claim 3, wherein the predetermined portion of the boot partition is less than the entire primary disk storage medium.

6. The computer program product of claim 5, wherein the predetermined portion of the boot partition is sufficient to allow loading of software RAID drivers for the primary and secondary disk storage mediums.

7. The computer program product of claim 1, wherein the computer usable program code for detecting hardware failure of a primary disk storage medium includes computer usable program code for initiating a cyclic redundancy check of at least a portion of the primary disk storage medium.

8. A method, comprising:

identifying a primary disk that is higher in a boot order than a secondary disk in a software RAID, wherein the boot order is maintained by the BIOS;

testing for a hardware failure of the primary disk during the BIOS power-on self test;

automatically changing the boot order of the disks in the software RAID to position the secondary disk in the RAID higher in the boot order than the primary disk in response to detecting a hardware failure in the primary disk; and then booting an operating system from the disk that is highest in the boot order.

9. The method of claim 8, wherein the step of automatically changing the boot order of the disks in the software RAID includes positioning the primary disk lower in the boot order than all other disks in the software RAID.

10. The method of claim 8, wherein the step of detecting hardware failure of a primary disk storage medium includes reading and verifying a predetermined portion of the boot partition of the primary disk storage medium.

11. The method of claim 10, wherein the predetermined portion of the boot partition is less than 100 megabytes.

12. The method of claim 10, wherein the predetermined portion of the boot partition is less than the entire primary disk storage medium.

13. The method of claim 12, wherein the predetermined portion of the boot partition is sufficient to allow loading of software RAID drivers for the primary and secondary disk storage mediums.

14. The method of claim 8, wherein the step of detecting hardware failure of a primary disk storage medium includes performing a cyclic redundancy check of at least a portion of the primary disk storage medium.

* * * * *